(12) United States Patent
Hagiwara et al.

(10) Patent No.: US 6,407,179 B1
(45) Date of Patent: Jun. 18, 2002

(54) ACRYLIC RUBBER AND ITS COMPOSITION

(75) Inventors: Shogo Hagiwara, Ichihara; Yasushi Abe, Niigata-ken; Masao Koga, Ichihara, all of (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,273

(22) Filed: Nov. 2, 1999

(51) Int. Cl.⁷ .................................................. C08J 20/10
(52) U.S. Cl. ..................... 525/330.3; 525/304; 525/305; 525/327.3; 525/328.9; 525/329.6; 525/330.5; 526/319
(58) Field of Search ................................ 525/279, 281, 525/304, 330.3, 330.5, 330.6, 327.3, 340; 526/328, 329, 328.5, 348.8

(56) References Cited

U.S. PATENT DOCUMENTS

| | | | | |
|---|---|---|---|---|
| 4,001,065 A | * | 1/1977 | Penneck et al. | 156/86 |
| 4,904,736 A | * | 2/1990 | Shimizu et al. | 525/279 |
| 5,082,903 A | * | 1/1992 | Kazuma | 425/340 |
| 5,376,739 A | * | 12/1994 | Pfleger et al. | 526/64 |
| 5,506,322 A | * | 4/1996 | Masayoshi et al. | 526/273 |
| 5,532,066 A | * | 7/1996 | Latiolais et al. | 428/516 |
| 5,654,377 A | * | 8/1997 | Latiolais et al. | 525/330.6 |
| 5,804,675 A | * | 9/1998 | Lathiolais et al. | 526/65 |

FOREIGN PATENT DOCUMENTS

| | | |
|---|---|---|
| DE | 38 19 336 | 12/1988 |
| DE | 196 07 003 | 8/1997 |
| GB | 1062969 | 3/1967 |

* cited by examiner

Primary Examiner—David W. Wu
Assistant Examiner—Tanya Zalukaeva
(74) Attorney, Agent, or Firm—Oblon, Spivak, McClelland, Maier & Neustadt, PC

(57) ABSTRACT

An acrylic rubber comprising at least 0.1 and less than 3 wt % of monomer units of ethylene, from 0 to 10 wt % of monomer units of a cross-linkable monomer, and more than 87 and not more than 99.9 wt % of monomer units of at least one alkyl acrylate.

20 Claims, No Drawings

ACRYLIC RUBBER AND ITS COMPOSITION

The present invention relates to an acrylic rubber excellent in oil resistance and excellent in the balance of heat resistance and cold resistance, and its composition.

In recent years, along with trends for large size and high speed of industry, rubber materials to be used for such industry are required to have higher durability. Especially, the trends for large size and high speed have brought about an increase of the operation temperatures of machines and apparatus, whereby the rubber materials are required to have higher heat resistance, and at the same time, rubber materials which are in contact with lubricating oils, are required to have the oil resistance improved.

Further, due to broadening of the industrial activities, the demand for cold resistance is required for rubber materials to be used in a severe environment of e.g. a cold area.

On the other hand, in an engine room of an automobile, the thermal conditions have been increasingly severer due to e.g. higher power of the engine or to cope with exhaust gas. Accordingly, for example, for lubricant resistant hoses for automobiles, acryl rubber excellent in the heat resistance and oil resistance has now been used instead of conventional nitrile-butadiene rubber. However, severity of the thermal conditions in the engine and engine room has created an environment wherein the engine oil itself undergoes deterioration, and it has been known that such deteriorated engine oil will attack a rubber hose to deteriorate the rubber material. Accordingly, the material for a lubricating oil hose to be used in an engine room is desired to have higher oil resistance, cold resistance and heat resistance than ever, and improvement of the performance is required also for acryl rubber which has now been used as a heat resistant/oil resistant material.

Further, due to a trend for high performance of lubricating oil for an automobile, the viscosity of the lubricating oil tends to be low, whereby further improvement in the oil resistance has been required.

JP-B-59-14498 discloses that a rubber composition comprising a vulcanizing agent and a copolymer of ethylene (A)/vinyl acetate (B)/an acrylate (C) wherein (C) is from 6 to 90 wt % and the weight ratio of (A)/(B) is at most 1, is excellent in the oil resistance, heat resistance and weather resistance.

Further, JP-A-63-312338 discloses a copolymer of ethylene with other copolymer components wherein the content of the ethylene component is from 3 to 10 wt %, wherein said other copolymer components comprise from 0 to 10 wt % of vinyl acetate, more than 20 and not more than 45 wt % of ethyl acrylate and at least 45 and less than 70 wt % of n-butyl acrylate, and its composition. JP-A-63-312339 discloses an acrylic rubber composition comprising an amine cross-linking agent and a copolymer comprising from 3 to 10 wt % of ethylene, from 0.1 to 10 wt % of a certain cross-linkable monomer and other copolymer components, wherein said other copolymer components comprise from 0 to 10 wt % of vinyl acetate, from 20 to 45 wt % of ethyl acrylate and from 45 to 70 wt % of n-butyl acrylate.

With these compositions, it is observed that the oil resistance may be improved to some extent, and with the latter, an improvement of the cold resistance is also observed to some extent. However, in view of the severity of the practical conditions as mentioned above, a further improvement has been desired in the balance of the oil resistance, cold resistance and heat resistance.

Accordingly, it is an object of the present invention to solve the above problems and to provide an acrylic rubber excellent in heat resistance and excellent further in the balance of the cold resistance and oil resistance, and its composition.

The present inventors have conducted an extensive study to solve the above problems and as a result, have found that a copolymer comprising monomer units of ethylene, monomer units of an alkyl acrylate and, if necessary, monomer units of a cross-linkable monomer in a certain specific compositional ratio, will present a rubber excellent in the balance of the cold resistance, oil resistance and heat resistance. The present invention has been accomplished on the basis of this discovery.

That is, the present invention provides an acrylic rubber comprising at least 0.1 and less than 3 wt % of monomer units of ethylene, from 0 to 10 wt % of monomer units of a cross-linkable monomer, and more than 87 and not more than 99.9 wt % of monomer units of at least one alkyl acrylate.

Now, the present invention will be described in detail with reference to the preferred embodiments.

The acrylic rubber of the present invention is an acrylic rubber comprising at least 0.1 and less than 3 wt % of monomer units of ethylene, from 0 to 10 wt % of monomer units of a cross-linkable monomer, and more than 87 and not more than 99.9 wt % of monomer units of at least one alkyl acrylate.

The monomer units of ethylene are particularly preferably from 0.5 to 2.5 wt %. If the monomer units of ethylene are too much, the oil resistance tends to be inadequate.

The alkyl acrylate to be used in the present invention preferably includes ethyl acrylate, n-butyl acrylate, methyl acrylate, n-propyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Among them, an alkyl acrylate having a $C_{1-8}$ alkyl group is preferred, and ethyl acrylate and n-butyl acrylate are particularly preferred. The constituting ratio of alkyl acrylates is not particularly limited. However, from the viewpoint of the oil resistance, it is preferred that from 50 to 100 wt % of the alkyl acrylate is ethyl acrylate, or in the case where ethyl acrylate and n-butyl acrylate are used, the proportion of ethyl acrylate is form 50 to 100 wt %, based on the total amount of ethyl acrylate and n-butyl acrylate.

The acrylic rubber of the present invention may be one having other monomers copolymerizable with the above monomers co-polymerized within a range not to impair the object of the present invention. As such copolymerizable other monomers, alkyl acrylates such as cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate and 8-cyanooctyl acrylate, may be mentioned. Further, alkoxyalkyl acrylates such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate, may be mentioned.

Further, a fluorine-containing acrylate such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate or 1,1-dihydroperfluorodecyl (meth)acrylate, a hydroxyl group-containing acrylate such as 1-hydroxypropyl (meth)acrylate, 2-hydroxypropyl (meth)acrylate or hydroxyethyl (meth)acrylate, a tertiary amino group-containing acrylate such as diethylaminoethyl (meth)acrylate or dibutylaminoethyl (meth)acrylate, a methacrylate such as methyl methacrylate or octyl methacrylate, an alkyl vinyl ketone such as methyl vinyl ketone, a vinyl or allyl ether such as vinyl ethyl ether or allyl methyl ether, a vinyl aromatic compound such as styrene, α-methylstyrene, chlorostyrene or vinyltoluene, a vinyl nitrile such as acryl nitrile or methacrylonitrile, or an ethylenically unsaturated compound such as ethylene, propylene, vinyl chloride, vinylidene chloride, vinyl fluoride, vinylidene fluoride, vinyl acetate, vinyl propionate or an alkyl fumarate, may be mentioned.

Among them, an alkoxyalkyl acrylate, such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate or 2-(n-butoxy)propyl acrylate, is preferably employed.

The cross-linkable monomer to be used for the acrylic rubber of the present invention may be one containing an epoxy group, or one containing an active hydrogen group, a carboxyl group or both an epoxy group and a carboxyl group.

Specifically, the cross-linkable monomer to be used in the present invention may be one having an active chlorine group, such as 2-chloroethyl vinyl ether, 2-chloroethyl acrylate, vinyl benzyl chloride, vinyl chloroacetate or allyl chloroacetate, one having a carboxyl group, such as acrylic acid, methacrylic acid, crotonic acid, 2-pentenoic acid, maleic acid, fumaric acid, itaconic acid, a monoalkyl maleate or a monoalkoxyalkyl maleate, or one containing an epoxy group, such as glycidyl acrylate, glycidyl methacrylate, allyl glycidyl ether or methallyl glycidyl ether. Among them, a monoalkyl maleate or a monoalkoxyalkyl maleate is particularly preferred.

The acrylic rubber in the present invention preferably contains monomer units of such a cross-linkable monomer in an amount of from 0 to 10 wt %, preferably from 0.5 to 7 wt %.

The acrylic rubber of the present invention can be obtained by copolymerizing the above-mentioned monomers by a known method such as emulsion polymerization, suspension polymerization, solution polymerization or bulk polymerization.

The acrylic rubber of the present invention is vulcanized by applying a cross-linking agent which is commonly used for an acrylic rubber.

The cross-linking agent to be applied to an epoxy group-containing acrylic rubber having a monomer containing an epoxy group copolymerized, may, for example, be a cross-liking agent containing a polyfunctional organic acid, an organic ammonium carboxylate, an amine compound or an imidazole compound. Particularly preferred is a cross-linking agent containing an imidazole compound such as 1-methylimidazole, 1,2-dimethylimidazole, 1-methyl-2-ethylimidazole, 1-benzyl-2-ethylimidazole, 1-cyanoethyl-2-methylimidazole or 1-cyanoethyl-2-phenylimidazole.

As a cross-linking agent to be applied to an acrylic rubber containing an active chlorine group, a cross-linking agent containing a fatty acid metal soap, sulfur, a sulfur donor, a triazine derivative or a dithiocarbamic acid may, for example, be mentioned.

As a cross-linking agent to be used for an acrylic rubber containing a carboxyl group, a cross-linking agent containing an aliphatic polyvalent amine such as hexamethylenediamine, hexamethylenediamine carbamate or tetramethylenepentammine, or an aromatic polyvalent amine such as 4,4'-methylenedianiline, 4,4'-oxyphenyldiphenylamine, 4,4,'-methylenebis(o-chloroaniline), 4,4'-diaminobenzanilide or 3,3'-dimethyl-4,4'-diaminodiphenylmethane, may, for example, be mentioned.

Even in a case where no cross-linkable monomer is introduced, vulcanization can be carried out by using a cross-linking agent containing a peroxide.

Further, at the time of using it practically, the acrylic rubber composition of the present invention may be molded and vulcanized by an addition of an additive such as a filler, a plasticizer, a stabilizer, a lubricant or a reinforcing material, depending upon the particular purpose.

Carbon black to be used as a filler to the vulcanizate of the present invention is preferably one having an average particle size of at least 20 and less than 30 nm and a DBP oil absorption of at least 115 ml/100 g. Specific examples of such carbon black include Seast 7H, Seast #6, Seast 5H, Seast KH, Seast 3H, Seast NH, Seast N, etc., manufactured by Tokai Carbon K.K., and #80, etc., manufactured by Asahi Carbon K.K.

Here, the average particle size of carbon black is a value represented by a length average particle size measured by an electron microscopic method. The DBP oil absorption is a value measured in accordance with method A (mechanical method) of JIS K6221.

If the average particle size or the DBP oil absorption of carbon black is outside the above range, the balance of the extrusion processability, the surface smoothness and the tensile strength, tends to deteriorate.

Further, in addition to such carbon black, carbon black other than the above or an inorganic filler may be admixed.

The total amount of such additives including carbon black is preferably from 30 to 100 parts by weight per 100 parts by weight of the acrylic rubber.

Machines to be used for mixing, molding or vulcanizing the acrylic rubber, the acrylic rubber composition or its vulcanizate, of the present invention, may be those commonly used in the rubber industry.

The acrylic rubber, the acrylic rubber composition or its vulcanizate, of the present invention, is useful particularly for rubber hoses or for sealing materials such as gaskets or packings. Specifically, the rubber hoses may be hoses to be used for various piping systems of automobiles, construction machines or hydraulic machines.

Particularly, a rubber hose obtainable from the acrylic rubber, the acrylic rubber composition or its vulcanizate, of the present invention, is excellent not only in extrusion processability and the rubber physical properties such as tensile strength, but also in the oil resistance, cold resistance and heat resistance. Accordingly, it is very useful as a rubber hose for an automobile, of which the environment of use has recently become very severe.

With respect to the construction of the rubber hose, it may be a single hose made of the acrylic rubber of the present invention, or depending upon the application of the rubber hose, it may be a composite hose having a layer made of the acrylic rubber of the present invention combined with an inner layer, an inter layer or an outer layer made of a synthetic rubber other than the acrylic rubber of the present invention, such as a fluorine rubber, a fluorine-modified acrylic rubber, a hydrin rubber, CSM, CR, NBR or ethylene.propylene rubber.

Further, depending upon the properties required for the rubber hose, reinforcing yarns or wires may be provided as an inter layer or the outer most layer of the rubber hose, as commonly practiced.

Now, the present invention will be described in further detail with reference to Examples. However, it should be understood that the present invention is by no means restricted by such specific Examples.

EXAMPLES 1 to 6

Into a pressure-resistant reactor having an internal capacity of 40 l, 11 kg of a mixed liquid comprising ethyl acrylate and n-butyl acrylate, 17 kg of an aqueous solution containing 4 wt % of partially saponified polyvinylalcohol, 22 g of sodium acetate and 120 g of glycidyl methacrylate were charged in such proportions that the composition of the copolymer as identified in Table 1, would be obtainable, and preliminarily thoroughly mixed by a stirrer to obtain a uniform suspension. After replacing air at the upper portion in the reactor with nitrogen, ethylene was injected to the upper portion in the reactor, whereby the pressure was adjusted to a level of from 5 to 40 $kg/cm^2$. Stirring was continued to maintain the interior at 55° C., and then, from another inlet, an aqueous solution of t-butyl hydroperoxide was injected to initiate polymerization.

During the reaction, the internal temperature was maintained at 55° C., and the reaction was completed in 6 hours. An aqueous sodium borate solution was added to the formed polymer solution to solidify the polymer, followed by dehydration and drying to obtain a raw rubber.

EXAMPLES 7 and 8

In the same manner as in Example 1, a raw rubber of a copolymer was obtained by charging a mixed liquid comprising methyl acrylate, n-butyl acrylate, ethyl acrylate and 2-ethylhexyl acrylate in such proportions that the composition of the copolymer as identified in Table 1 would be obtainable, and adjusting the ethylene pressure to a level of 40 $kg/cm^2$.

Comparative Example 1, 2 and 5 to 7

A raw rubber of a copolymer was obtained in the same manner as in Example 1 except that ethylene was not introduced.

Comparative Example 3

A raw rubber of a copolymer was prepared in the same manner as in Example 1 except that the ethylene pressure was changed to 50 $kg/cm^2$.

Comparative Example 4 and 8

A raw rubber of a copolymer was prepared in the same manner as in Example 1 except that the ethylene pressure was changed to 80 $kg/cm^2$.

Comparative Example 9 and 10

In the same manner as in Example 1, a raw rubber of a copolymer was prepared by charging a mixed liquid comprising methyl acrylate, n-butyl acrylate, ethyl acrylate and 2-ethylhexyl acrylate in such proportions that the composition of the copolymer as identified in Table 2 would be obtained, and introducing no ethylene.

EXAMPLES 9 to 11

In the same manner as in Example 1, a raw rubber of a copolymer was prepared by introducing a mixed liquid comprising ethyl acrylate, n-butyl acrylate and monobutyl maleate in such proportions that the composition of the copolymer as identified in Table 4 would be obtainable, and adjusting the ethylene pressure to 40 $kg/cm^2$.

EXAMPLE 12

A raw rubber of a copolymer was prepared in the same manner as in Example 9 except that monobutyl maleate was changed to monomethoxyethyl maleate.

EXAMPLE 13

A raw rubber of a copolymer was prepared in the same manner as in Example 9 except that monobutyl maleate was changed to monoethoxyethyl maleate.

Comparative Examples 11 and 13

A raw rubber of a copolymer was prepared in the same manner as in Example 9 except that no ethylene was introduced.

Comparative Example 12

A raw rubber of a copolymer was prepared in the same manner as in Example 9 except that the ethylene pressure was changed to 80 $kg/cm^2$.

Comparative Example 14

Commercially available Vamac G (a copolymer of ethylene, methyl acrylate and a carboxyl group-containing cross-linkable monomer) manufactured by DuPont and having an ethylene content of about 41 wt %, was employed.

EXAMPLE 14

A blend having the polymer of Example 2 kneaded in accordance with the blend composition as identified in Table 3, was extruded in the form of a hose by means of a single screw extruder manufactured by Mitsuba Seisakusyo (screw diameter: 50 mm, screw shape: double helical, screw L/D: 8) at a screw rotational speed of 20 rpm at set temperatures of the extruder being a feed inlet temperature of 50° C., a barrel temperature of 70° C., a head temperature of 90° C. and a die temperature of 110° C. At an extrusion rate of 160 cm/min, an unvulcanized molded product in a hose shape having a smooth skin with an outer diameter of 14 mm and an inner diameter of 9 mm, was obtained. The obtained unvulcanized molded product was subjected to steam vulcanization for 20 minutes under steam pressure at 160° C. in a vulcanizer and then further subjected to heat treatment at 170° C. for 4 hours in a Geer oven to obtain a hose.

Comparative Example 15

A blend having the polymer of Comparative Example 14 kneaded in accordance with the blend composition as identified in Table 5, was extruded in the form of a hose by means of a single screw extruder manufactured by Sanyo Seisakusyo in the same manner as in Example 14. The extrusion rate was 170 cm/min. The obtained unvulcanized molded product was subjected to steam vulcanization and heat treatment in a Geer oven, in the same manner as in Example 14 to obtain a hose.

EXAMPLE 15

A blend having the polymer of Example 9 kneaded in accordance with the blend composition as identified in Table 5, was injection-molded by vertical injection molding machine manufactured by Matsuda Seisakusyo using a mold for an O-ring. The vulcanization condition was 190° C. for 3 minutes, and after being taken out from the mold of the injection molding machine, the molded product was further subjected to heat treatment at 170° C. for 4 hours in a Geer oven, to obtain an oil seal as an O-ring molded product.

Comparative Example 16

A blend having the polymer of Comparative Example 14 kneaded in accordance with the blend composition as identified in Table 5, was subjected to injection molding and heat treatment in a Geer oven in the same manner as in Example 15 to obtain an oil seal as an O-ring molded product.

Preparation of Vulcanizates (Examples 1 to 13 and Comparative Examples 1 to 14)

Each of the raw rubbers obtained in Examples 1 to 8 and Comparative Examples 1 to 10, was subjected to kneading by a 8 inch open roll mill in accordance with the blend composition as identified in Table 3, and each of the raw rubbers obtained in Examples 9 to 13 and Comparative Examples 11 to 14, was subjected to kneading by a 8 inch open roll mill in accordance with the blend composition as identified in Table 5, to obtain a sheet having a thickness of 2.4 mm, followed by press vulcanization at 170° C. for 10 minutes by a press vulcanizer.

The vulcanizate thereby obtained was further subjected to heat treatment at 170° C. for 4 hours in a Geer oven and then subjected to physical property tests.

Analytical Test Methods

A raw rubber of a copolymer was passed through a roll mill and then dissolved in toluene, whereupon the nuclear magnetic resonance spectrum was taken, and the respective components were quantitatively analyzed. To obtain the nuclear magnetic resonance spectrum, JNMα-500, manufactured by Nippon Denshi K.K., was used. Further, the quantitative analyses of the monoalkyl maleate and the monoalkoxyalkyl maleate were carried out by dissolving a raw rubber of a copolymer in toluene, followed by neutralization titration by means of potassium hydroxide.

Physical Property Test Methods

The tensile strength and elongation were measured in accordance with JIS K6251.

The hardness was measured in accordance with JIS K6253.

The compression set was measured in accordance with JIS K6262 by measuring the strain upon expiration of 70 hours at 150° C.

The oil resistance ($\Delta V$) was obtained in accordance with JIS K6258, whereby the volume change $\Delta V$ (%) after immersion at 150° C. for 70 hours in IRM-903 oil, was obtained.

The cold resistance was obtained in accordance with JIS K6261, whereby T100 (the temperature at which the relative modulus as a value against the modulus at 23° C., becomes 100) was obtained.

The heat resistance AR (EB) was obtained in accordance with JIS K6257, whereby the elongation retaining rate AR (EB) (%) in the tensile test after exposure at 175° C. for 70 hours, was obtained.

The results of measurements of the vulcanizates with respect to Examples 1 to 8, are shown in Table 1, the results of measurements of the vulcanizates with respect to Comparative Examples 1 to 10 are shown in Table 2, and the results of measurements of the vulcanizates with respect to Examples 9 to 13 and Comparative Examples 11 to 14, are shown in Table 4.

Physical Property Test Methods for a Hose

A hose was cut open and subjected to the physical property tests.

The tensile strength and the elongation were measured in accordance with JIS K6251.

The hardness was measured in accordance with JIS K6253.

The cold resistance was obtained in accordance with JIS K6261, whereby the temperature of T100 was obtained.

The oil resistance ($\Delta V$) was obtained in accordance with JIS K6258, whereby the volume change $\Delta V$ (%) after immersion at 150° C. for 70 hours in IRM-903 oil, was obtained.

The results of measurements of the vulcanizates with respect to the respective Examples and Comparative Examples, are shown in Table 6.

The Physical Property Test Methods for an Oil Seal

The oil seal was cut every 2 cm and subjected to the oil resistance test.

The hardness was measured in accordance with JIS K6253.

The cold resistance was measured in such a manner that the test sample was left to stand at −30° C. for 24 hours, followed by bending to see if it broke.

The oil resistance ($\Delta V$) was obtained in accordance with JIS K6258, whereby the volume change $\Delta V$ (%) after immersion at 150° C. for 70 hours in IRM-903 oil, was obtained.

The results of measurements of the vulcanizates with respect to the respective Examples and Comparative Examples, are shown in Table 7.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Composition | | | | | | | | |
| Ethylene | 0.5 | 2 | 2 | 2 | 2 | 2 | 2 | 2 |
| Glycidyl methacrylate | 1.1 | 1.1 | 1.1 | 1.2 | 1.2 | 1.2 | 1.1 | 1.1 |
| Acrylates Breakdown | 98.4 | 96.9 | 96.9 | 96.8 | 96.8 | 96.8 | 96.9 | 96.9 |
| Methyl acrylate | | | | | | | 30 | |
| Ethyl acrylate | 51 | 51 | 39 | 100 | 91 | 80 | | 60 |
| Butyl acrylate | 49 | 49 | 61 | 0 | 9 | 20 | 70 | |
| Ethylhexyl acrylate | | | | | | | | 40 |
| Physical properties | | | | | | | | |
| Tensile strength MPa | 11.3 | 11.4 | 11.6 | 12.3 | 12.4 | 12.3 | 10.5 | 10.3 |
| Elongation % | 330 | 330 | 300 | 330 | 300 | 310 | 280 | 290 |
| Hardness | 56 | 57 | 58 | 66 | 67 | 62 | 59 | 58 |
| Compression set % | 25 | 24 | 27 | 24 | 26 | 22 | 29 | 30 |
| Oil resistance ($\Delta V$) % | 40 | 41 | 52 | 14 | 19 | 21 | 51 | 52 |
| Cold resistance (T100) ° C. | −35 | −36 | −39 | −22 | −24 | −27 | −40 | −41 |
| Heat resistance (AR(EB)) % | 94 | 91 | 93 | 92 | 93 | 90 | 90 | 93 |

TABLE 2

| | Comparative Ex. 1 | Comparative Ex. 2 | Comparative Ex. 3 | Comparative EX. 4 | Comparative Ex. 5 | Comparative Ex. 6 | Comparative Ex. 7 | Comparative Ex. 8 | Comparative Ex. 9 | Comparative Ex. 10 |
|---|---|---|---|---|---|---|---|---|---|---|
| Composition | | | | | | | | | | |
| Ethylene | 0 | 0 | 3 | 5 | 0 | 0 | 0 | 5 | 0 | 0 |
| Glycidyl methacrylate | 1.1 | 1.1 | 1.1 | 1.7 | 1.2 | 1.2 | 1.2 | 1.7 | 1.1 | 1.1 |
| Acrylates | 98.9 | 98.9 | 95.9 | 93.3 | 98.8 | 98.8 | 98.8 | 93.3 | 98.9 | 98.9 |
| Breakdown | | | | | | | | | | |
| Methyl acrylate | | | | | | | | | 30 | |
| Ethyl acrylate | 50 | 45 | 50 | 39 | 100 | 90 | 81 | 80 | | 60 |
| Butyl acrylate | 50 | 55 | 50 | 61 | 0 | 10 | 19 | 20 | 70 | |
| Ethylhexyl acrylate | | | | | | | | | | 40 |
| Physical properties | | | | | | | | | | |
| Tensile strength MPa | 11.2 | 11 | 11.4 | 11.5 | 12.5 | 12.6 | 12.3 | 11.1 | 10.8 | 10.6 |
| Elongation % | 320 | 330 | 320 | 330 | 320 | 300 | 300 | 300 | 270 | 280 |
| Hardness | 56 | 56 | 57 | 58 | 66 | 67 | 63 | 64 | 60 | 59 |
| Compression set % | 25 | 26 | 26 | 22 | 27 | 25 | 25 | 23 | 29 | 29 |
| Oil resistance (ΔV) % | 40 | 47 | 45 | 56 | 14 | 19 | 21 | 26 | 52 | 51 |
| Cold resistance (T100) ° C. | −32 | −35 | −35 | −39 | −18 | −22 | −25 | −28 | −35 | −35 |
| Heat resistance (AR(EB)) % | 91 | 94 | 91 | 94 | 92 | 93 | 92 | 91 | 90 | 93 |

TABLE 3

| Components of composition | Amount (parts by weight) |
|---|---|
| Raw rubber | 100 |
| Stearic acid | 1 |
| Antioxidant #445 *1) | 1 |
| MAF carbon black *2) | 50 |
| Liquid paraffin | 1 |
| Trimethylthiourea | 1 |
| 1,2-Dimethylimidazole | 2 |
| Cetyl trimethylammonium bromide | 0.5 |

TABLE 5

| Components of composition | Amount (parts by weight) |
|---|---|
| Raw rubber | 100 |
| Stearic acid | 1 |
| Now guard #445 1) | 1 |
| MAF carbon black | 50 |
| Liquid paraffin | 1 |
| 4,4,-Methylenedianiline | 0.7 |
| Di-o-tolylguanidine | 2 |

1) Antioxidant, manufactured by Uni Royal Company

TABLE 4

| | Ex. 9 | Ex. 10 | Ex. 11 | Ex. 12 | Ex. 13 | Comparative Ex. 11 | Comparative Ex. 12 | Comparative Ex. 13 | Comparative Ex. 14 |
|---|---|---|---|---|---|---|---|---|---|
| Composition | | | | | | | | | |
| Ethylene wt % | 2.0 | 2.0 | 2.0 | 2.0 | 2.0 | 0.0 | 5.0 | 0.0 | VAMAC-G |
| Monobutyl maleate wt % | 5.0 | 7.0 | 7.0 | | | 5.0 | 5.0 | 7.0 | |
| Monomethoxyethyl maleate wt % | | | | 5.0 | | | | | |
| Monoethoxyethyl maleate wt % | | | | | 5.0 | | | | |
| Total amount of acrylates wt % | 93.0 | 91.0 | 91.0 | 93.0 | 93.0 | 95.0 | 90.0 | 93.0 | |
| Breakdown | | | | | | | | | |
| Ethyl acrylate | 50 | 50 | 90 | 50 | 50 | 50 | 50 | 90 | |
| n-Butyl acrylate | 50 | 50 | 10 | 50 | 50 | 50 | 50 | 10 | |
| Physical properties | | | | | | | | | |
| Tensile strength MPa | 13.2 | 13.4 | 13.0 | 13.2 | 13.3 | 13.1 | 13.3 | 12.9 | 14.3 |
| Elongation % | 190 | 170 | 220 | 200 | 190 | 190 | 190 | 230 | 500 |
| Hardness | 68 | 73 | 83 | 69 | 70 | 67 | 68 | 82 | 74 |
| Compression set % | 18 | 19 | 19 | 15 | 16 | 18 | 18 | 20 | 23 |
| Oil resistance (ΔV) % | +34 | +33 | +15 | +33 | +34 | +34 | +39 | +15 | +63 |
| Cold resistance (T100) ° C. | −35 | −34 | −24 | −35 | −35 | −30 | −35 | −20 | −36 |
| Heat resistance (AR(EB)) % | 100 | 94 | 100 | 95 | 100 | 100 | 100 | 96 | 92 |

TABLE 6

|  |  | Ex. 14 | Comparative Ex. 15 |
|---|---|---|---|
| Composition | Ethylene wt % | 2 | VAMAC-G |
|  | Glycidyl methacrylate wt % | 1.1 |  |
|  | Acrylates wt % | 96.9 |  |
|  | Breakdown |  |  |
|  | Ethyl acrylate wt % | 51 |  |
|  | Butyl acrylate wt % | 49 |  |
| Physical properties | Tensile Strength MPa | 10.3 | 12.2 |
|  | Elongation % | 340 | 520 |
|  | Hardness | 52 | 65 |
|  | Cold resistance ° C. (T100) | −36 | −36 |
|  | Oil resistance % (ΔV) | 43 | 55 |

TABLE 7

|  |  | Ex. 15 | Comparative Ex. 16 |
|---|---|---|---|
| Composition | Ethylene wt % | 2.0 | VAMAC-G |
|  | Monobutyl maleate wt % | 5.0 |  |
|  | Total amount of acrylates wt % | 93.0 |  |
|  | Breakdown |  |  |
|  | Ethyl acrylate wt % | 50 |  |
|  | n-Butyl acrylate wt % | 50 |  |
| Physical properties | Hardness | 66 | 72 |
|  | Cold resistance: bending test at −30° C. | Not broken | Not broken |
|  | Oil resistance % (ΔV) | +37 | +68 |

When the respective data are compared as between Example 1 or 2 and Comparative Example 2 or 3, Example 3 and Comparative Example 4, and Example 6 and Comparative Example 8, where the levels of the cold resistance represented by T100 are substantially the same, it is evident that Examples of the present invention are extremely superior in the level of oil resistance represented by the volume change ΔV.

Further, when the respective data are compared as between Example 2 and Comparative Example 3, Example 4 and Comparative Example 5, Example 5 and Comparative Example 6, Example 6 and Comparative Example 7, Example 7 and Comparative Example 9, and Example 8 and Comparative Example 10, where the levels of oil resistance ΔV are substantially the same, it is evident that Examples of the present invention are superior in the cold resistance.

Likewise, when the respective data are compared as between Example 9 and Comparative Example 12, Example 10 and Comparative Example 12, Example 12 and Comparative Example 12, Example 13 and Comparative Example 12, and Example 9 and Comparative Example 14, where the levels of cold resistance represented by T100 are substantially the same, it is evident that Examples of the present invention are extremely superior in the level of oil resistance represented by the volume change ΔV.

Further, when the respective data are compared as between Example 9 and Comparative Example 11, Example 10 and Comparative Example 11, Example 12 and Comparative Example 11, Example 13 and Comparative Example 11, and Example 11 and Comparative Example 13, where the levels of oil resistance ΔV are substantially the same, it is evident that Examples of the present invention are superior in the cold resistance.

Also from the comparison of hoses shown in Table 6 and from the comparison of oil seals shown in Table 7, it is evident that Examples of the present invention are excellent in the balance of cold resistance and oil resistance.

As shown by the comparison between Examples and Comparative Examples, the vulcanizates of the acrylic rubbers of the present invention and their compositions not only have excellent rubber physical properties and heat resistance, but also are excellent in the balance of cold resistance and oil resistance.

What is claimed is:

1. An acrylic rubber comprising at least 0.1 and less than 3 wt % of monomer units of ethylene, from 0 to 10 wt % of monomer units of a cross-linkable monomer, and more than 87 and not more than 99.9 wt % of monomer units of at least one alkyl acrylate, wherein from 50 to 100 wt % of the alkyl acrylate is ethyl acrylate.

2. An acrylic rubber comprising at least 0.5 to 2.5 wt % of monomer units of ethylene, from 0 to 10 wt % of monomer units of a cross-linkable monomer, and more than 87 and not more than 99.9 wt % of monomer units of at least one alkyl acrylate.

3. The acrylic rubber according to claim 1, wherein the alkyl acrylate is ethyl acrylate and/or n-butyl acrylate.

4. The acrylic rubber according to claim 1, wherein the cross-linkable monomer is a monoalkyl maleate or a monoalkoxyalkyl maleate.

5. An acrylic rubber composition comprising an acrylic rubber as defined in claim 1, and a cross-linking agent.

6. A vulcanizate obtained by vulcanizing an acrylic rubber composition as defined in claim 5.

7. A rubber hose obtained by vulcanizing an acrylic rubber composition as defined in claim 5.

8. A sealing material obtained by vulcanizing an acrylic rubber composition as defined in claim 5.

9. The acrylic rubber according to claim 1, comprising 0.5 to 7 wt. % of monomer units of the cross-linkable monomer.

10. The acrylic rubber according to claim 1, wherein the cross-linkable monomer contains an epoxy group, an active hydrogen group, a carboxyl group or both an epoxy group and a carboxyl group.

11. The acrylic rubber according to claim 1, wherein the cross-linkable monomer is glycidyl methacrylate.

12. The acrylic rubber according to claim 2, the alkyl acrylate is ethyl acrylate and/or n-butyl acrylate.

13. The acrylic rubber according to claim 2, wherein the cross-linkable monomer is a monoalkyl maleate or a monoalkoxyalkyl maleate.

14. An acrylic rubber composition comprising an acrylic rubber as defined in claim 2, and a cross-linking agent.

15. A vulcanizate obtained by vulcanizing an acrylic rubber composition as defined in claim 14.

16. A rubber hose obtained by vulcanizing an acrylic rubber composition as defined in claim 14.

17. A sealing material obtained by vulcanizing an acrylic rubber composition as defined in claim 14.

18. The acrylic rubber according to claim 2, comprising 0.5 to 7 wt. % of monomer units of the cross-linkable monomer.

19. The acrylic rubber according to claim 2, wherein the cross-linkable monomer contains an epoxy group, an active hydrogen group, a carboxyl group or both an epoxy group and a carboxyl group.

20. The acrylic rubber according to claim 2, wherein the cross-linkable monomer is glycidyl methacrylate.

* * * * *